United States Patent
Hall et al.

(10) Patent No.: US 10,138,675 B2
(45) Date of Patent: Nov. 27, 2018

(54) BATTERY HOUSING SHAPED TO FIT IN A HEADRAIL OF A WINDOW BLIND

(71) Applicants: David R. Hall, Provo, UT (US); Austin Carlson, Provo, UT (US); Mark Madsen, Provo, UT (US); Terrece Pearman, Draper, UT (US); Emily Brimhall, Apline, UT (US)

(72) Inventors: David R. Hall, Provo, UT (US); Austin Carlson, Provo, UT (US); Mark Madsen, Provo, UT (US); Terrece Pearman, Draper, UT (US); Emily Brimhall, Apline, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/432,402

(22) Filed: Feb. 14, 2017

(65) Prior Publication Data
US 2018/0230742 A1  Aug. 16, 2018

(51) Int. Cl.
*H01M 10/052* (2010.01)
*E06B 9/323* (2006.01)
*E06B 9/38* (2006.01)
*H01M 2/10* (2006.01)

(52) U.S. Cl.
CPC .......... *E06B 9/323* (2013.01); *E06B 9/38* (2013.01); *H01M 2/1055* (2013.01)

(58) Field of Classification Search
CPC combination set(s) only.
See application file for complete search history.

(56) References Cited

U.S. PATENT DOCUMENTS 4,429,025 A  *  1/1984  Stow .................. H01M 2/1066
                                                    429/100

* cited by examiner

*Primary Examiner* — Olatunji A Godo

(57) ABSTRACT

Window blinds with automated mechanisms that require a power source often include a battery housing that is placed at least partially outside of the headrail. This is done to make room for mechanical devices that are required to be housed within the headrail. We disclose a battery housing which may be mounted within a headrail of a window blind. Consequently, the battery housing is not visible when the headrail is mounted. This creates a more aesthetically pleasing window treatment. The disclosed battery housing may include a base mounted on two elongated battery compartments. An elongated channel may separate the two elongated battery compartments. The elongated channel is designed to allow a tilt rod within the headrail to pass through.

20 Claims, 6 Drawing Sheets

BATTERY HOUSING SHAPED TO FIT IN A HEADRAIL OF A WINDOW BLIND

BACKGROUND

Field of the Invention

This disclosure relates to battery housings, specifically for use in battery operated window blinds.

Background of the Invention

Window blinds typically include a headrail from which the slats hang. More recently, window blinds are automated and motor-controlled which requires a power source. Often, the power source is one or more batteries.

While it is desirable to design a headrail for a window blind to be thin and sleek without parts protruding from the headrail, it is difficult to fit a battery housing into a headrail in an aesthetically pleasing manner. This is problematic because a bulky battery housing protruding from a headrail is unappealing. However, the headrail of a window blind, particularly a window blind that has automated power features, typically includes multiple pieces of hardware, all of which, must fit within a narrow headrail.

One difficulty is that a tilt rod is typically found within the headrail. A gearbox assembly may engage and rotate the tilt rod causing the slats on the window blind to tilt thus modifying the amount of light that the window blinds let into the adjacent room. Because the tilt rod extends substantially the length of the headrail, traditional battery housings do not fit within the headrail without protruding out of the headrail or comprising some less than attractive design.

A battery housing that fits discretely within a headrail of a window blind and without intruding on the space needed for the tilt rod is needed.

BRIEF SUMMARY OF THE INVENTION

We disclose a battery housing which may be mounted within a headrail of a window blind. The battery housing may be enclosed within the headrail so that it is not visible once the window blinds are installed.

The battery housing may include two elongated battery compartments. The elongated battery compartments may vary in size and shape depending on the battery requirement of the window blind.

An elongated channel may separate the two elongated battery compartments. The elongated channel provides a space for the tilt rod within the headrail to pass. Thus, the tilt rod may pass between the elongated battery compartments and rotate as needed without interference from the battery housing.

The battery housing may include a base to which the elongated battery compartments may be attached along their longest sides (their length). The base may have a first and a second side and be substantially flat. The second side may be attached to the elongated battery compartments. When mounted into a headrail, the elongated battery compartments may sit within the headrail and with the base covering them. Consequently, when looking into the headrail, the elongated battery compartments may not be visible. Only the first side of the base may be visible. In some embodiments, the first side may simply appear to be a flat cover similar to the top of a box.

In some embodiments, the elongated battery compartments may be cylindrical in shape. In other embodiments, the elongated battery compartments may have a cross-section that is either substantially rectangular or substantially square. The size and shape of batteries to be housed within the elongated battery compartments may impact the size and shape of the elongated battery compartments.

The base may also vary in shape in different embodiments of the disclosed battery housing. In some embodiments, the base may be substantially rectangular. In other embodiments, the base may be substantially square. In some embodiments, the width of the base will be approximately the width of the headrail into which it will be mounted.

The elongated battery compartments may include an orifice into which batteries may be inserted and retrieved. The orifice may be positioned on the end of each of the elongated battery compartments such that the batteries may be dropped into the elongated battery compartments, sliding into position along the length of the elongated battery compartment. The orifices may be covered by a removable lid or cover.

In other embodiments, the orifices through which batteries may be inserted into the elongated battery compartments may be positioned along the longer side or each of the elongated battery compartments. The first side of the base may be removably attached to both the second side of the base and the elongated battery compartments along their lengths. The first side of the base may act as a cover for the openings. Consequently, a user may remove the first side of the base from the second side of the base and the elongated battery compartments, insert batteries into the openings, then replace the first side of the base.

In some embodiments, at least one of the elongated battery compartments includes an orifice through which wires may be inserted. In some embodiments, at least one of the elongate battery compartments includes a port which may connect the batteries to devices which may recharge the batteries or to mechanical devices within the headrail which operate using power from the batteries.

The battery housing may include a variety of means for securing the battery housing into the headrail. In some embodiments, the means may be attached to the base.

DETAILED DESCRIPTION OF THE INVENTION

Definitions

Figure 1:
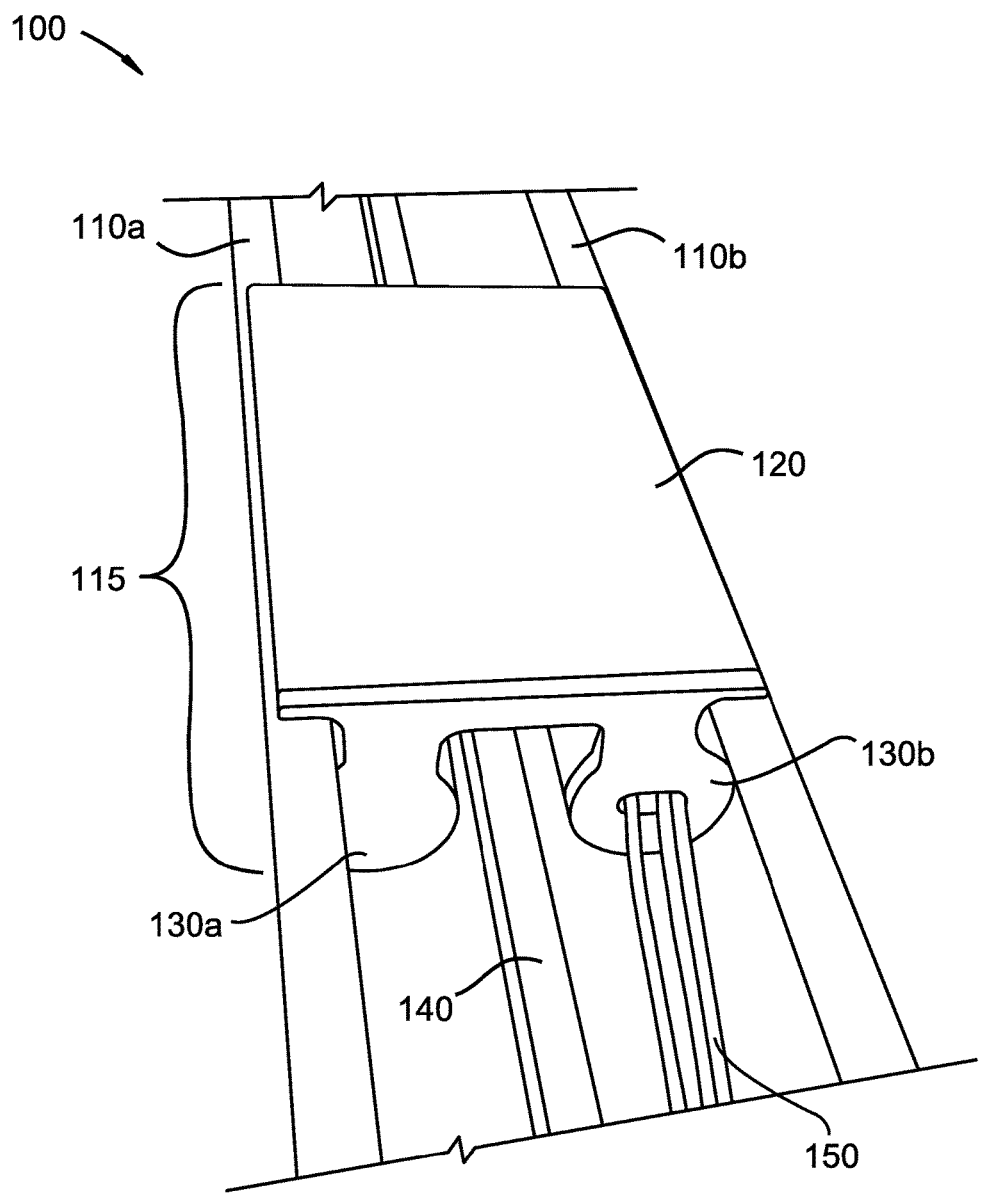
FIG. 1 illustrates a section of a headrail of a window blind as seen looking into the bottom of the headrail within which is shown a battery housing according to the disclosure.

Window blind, as used herein, means a blind that covers an opening in a building, including a window or door.

While this invention is susceptible of embodiment in many different forms, there are shown in the drawings, which will herein be described in detail, several specific embodiments with the understanding that the present disclosure is to be considered as an exemplification of the principals of the invention and is not intended to limit the invention to the illustrated embodiments.

We disclose a battery housing which may be mounted within a headrail of a window blind without protruding out of the headrail. The battery housing may consist of two elongated battery compartments for housing either one or a plurality of batteries. The elongated battery compartments may be substantially parallel to each other. Depending on the size and shape of the batteries, the elongated battery compartments may be constructed to have one of a variety of different cross-sectional shapes. In some embodiments of the disclosed battery housing, the cross-section of each of the elongated battery compartments may be substantially round, substantially square, or substantially rectangular. Because the size and shape of batteries may vary, so may the dimensions of the two elongated battery compartments. For example, in some embodiments, the length of each of the two elongated battery compartments may between approximately 2 inches and approximately 8 inches. In some embodiments, the length of each of the two elongated battery compartments may between approximately 4 inches and approximately 6 inches.

At least one of the two elongated battery compartments may include an orifice which may be used to inserting wires. This feature may be included in certain embodiments because the batteries may power other hardware that is used to operate the window blind, for example, a gearbox. The wires may be used to connect the batteries to this other hardware. The wires may also be used to connect the batteries to means for recharging the batteries. In some embodiments, at least one of the two elongated battery compartments may include a universal serial bus (USB) port for connecting the batteries to other devices.

The battery housing may also include an elongated channel which may be located between and may be substantially parallel to the two elongated battery compartments. This elongated channel may allow a tilt rod to extend the length of the headrail and rotate without interference from the battery housing.

The battery housing may also include a somewhat flattened base. The base may have two sides, a first and a second side. One side of the base, the second side, may be connected to the two elongated battery compartments along their longer sides. In embodiments in which the elongated battery compartments are cylindrical (with a circular cross-section) and the base is substantially flat, the base connected to the elongated battery compartments may resemble a pontoon raft. In some embodiments, the two sides of the base may be substantially flat. In some embodiments, the base may be substantially rectangular while in other embodiments, the base may be substantially square in shape.

Part of the second side of the base between the two elongated battery compartments may define the bottom of an elongated channel which may be located between the two elongated battery compartments. When the battery housing is mounted in a headrail, the tilt rod in the headrail may extend through the elongated channel between the two elongated battery compartments without interference.

The width of the elongated channel may be such that a tilt rod may extend through the elongated channel and turn without interference with the elongated battery compartments. In some embodiments, the width of elongated channel may be between approximately 0.5 inches and approximately 3 inches. In some embodiments, the width of the elongated channel may be between approximately 1 inch and approximately 2 inches.

Different embodiments of the battery housing may have different means for installing batteries. In one embodiment, each of the two elongated battery compartments has an aperture for inserting batteries and a removable lid which covers each aperture. In some embodiments, the apertures may be on the short end of the elongated battery compartments and batteries may be dropped lengthwise through the apertures followed by closing the lid before use.

In some embodiments, a top layer or first side of the base may be removably connected to the two elongated battery compartments and the second side of the base. The first side of the base may be removed to expose an opening in the longer side of each of the two elongated battery compartments for inserting batteries. After inserting batteries, possibly lengthwise, through the openings, the first side of the base may be reconnected to the second side of the base and the elongated battery compartments thus covering the openings.

The battery housing may be constructed from a variety of materials. These materials may include, but are not limited to, synthetic hydrocarbon polymer, wood, aluminum, or combinations thereof. In some embodiments, the synthetic hydrocarbon polymer may be high-density polyethylene, low-density polyethylene, polyvinyl chloride, high impact polystyrene, polycarbonate, polycarbonate/acrylonitrile butadiene styrene, or combinations thereof.

The battery housing may include fastening devices for securing the battery housing to the headrail when the battery housing is mounted. In some embodiments, the fastening devices may be connected to the base. In some such embodiments, the fastening devices may connect the base to the longitudinal sides of the headrail to hold the battery housing in place. The fastening devices may include clips, magnets, hooks, screws, bolts with nuts, clamps, clasps, flanges, clutches, and other fastening devices known in the art.

Referring now to the drawings, FIG. 1 shows headrail 100 which is a section of a headrail in which a battery housing according to the disclosure is mounted. Headrail 100 includes left and right edges 110a and 110b respectively. Tilt rod 140 is between left edge 110a and right edge 110b of headrail 100. Battery housing 115, which is an embodiment of the disclosed battery housing, is shown mounted within headrail 100. Battery housing 115 includes base 120 and two elongated compartments, 130a and 130b. Tilt rod 140 runs between elongated battery compartments 130a and 130b. Elongated compartment 130b includes an orifice through which wires 150 extend.

Figure 2:
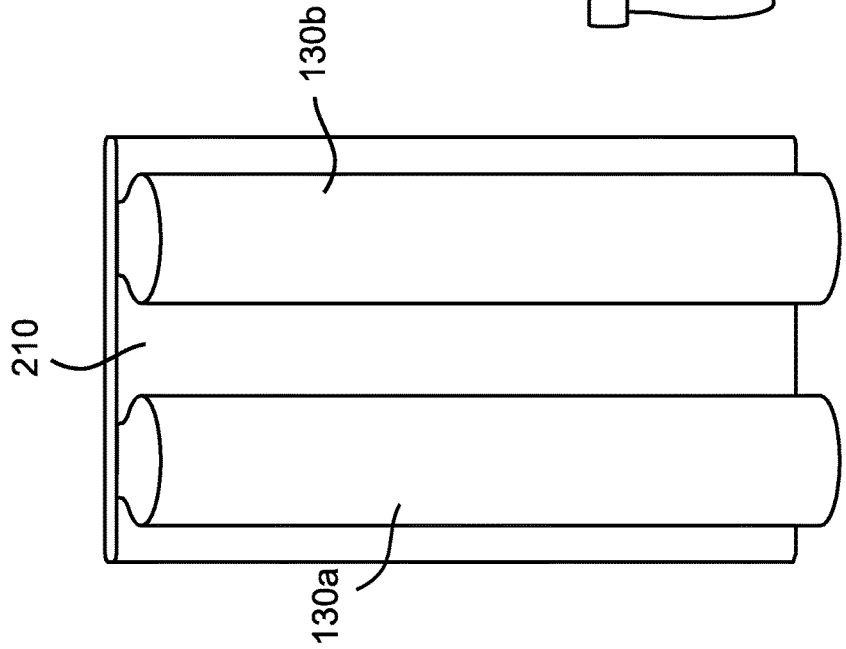
FIG. 2 illustrates a top view of a battery housing according to the disclosure.

FIG. 2 shows the lower side of the battery housing 115 which was first presented in FIG. 1. Battery housing 115 shows two elongated battery compartments 130a and 130b which are mounted on base 120. Elongated channel 210 is shown between elongated battery compartments 130a and 130b. Elongated channel 210 is where the tilt rod will sit when battery housing 115 is mounted into a headrail.

Figure 3:
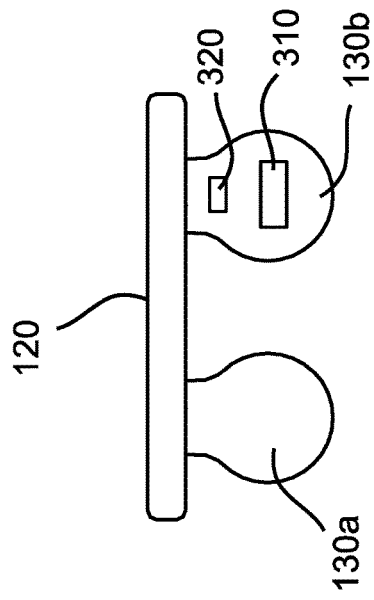
FIG. 3 illustrates an end view of the battery housing presented in FIG. 2.

FIG. 3 is a side view of battery housing 115 presented in FIGS. 1 and 2. The ends of elongated battery compartments 130a and 130b are shown. Elongated battery compartment 130b includes orifice 310 through which wires may be inserted. Elongated battery compartment 130b also includes port 320 which may be used to connect the batteries within battery housing 115 to a power source to recharge or to other mechanical devices within the headrail.

Figure 4:
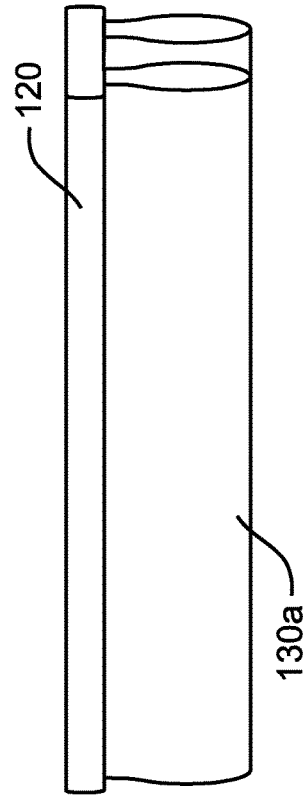
FIG. 4 illustrates a side view of the battery housing presented in FIG. 2.

FIG. 4 shows a side view of battery housing 115. The longer side of elongated compartment 130a is visible below base 120. While FIGS. 1-4 illustrate elongated battery compartments 103a and 130b a cylindrical in shape, other shapes are within the scope of this disclosure. These include, but are not limited to elongated battery compartments with cross-sections that are substantially square or substantially rectangular. In addition, while base 120 is illustrated in FIGS. 1-4 as rectangular, other shapes are within the scope of this disclosure. For example, the base may be substantially square.

Figure 5:
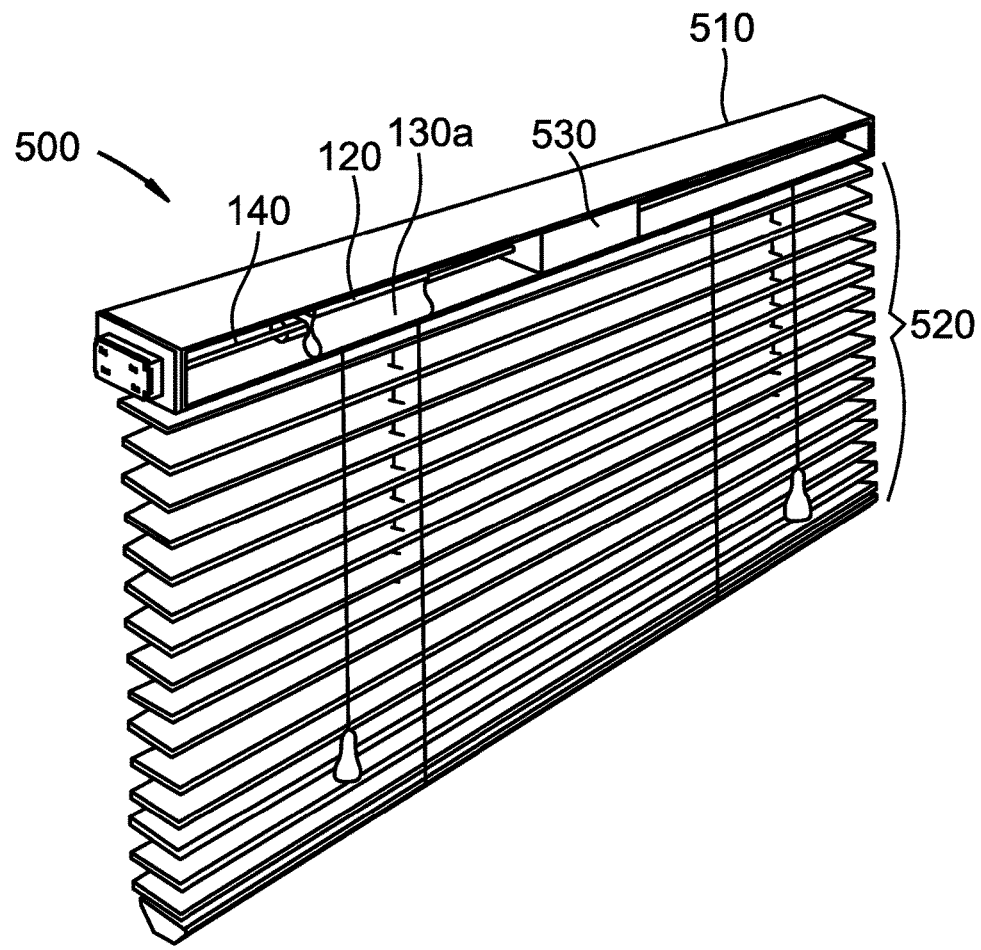
FIG. 5 illustrates a window blind that includes a headrail with a front side cut away to reveal an embodiment of the disclosed battery housing.

FIG. 5 shows window blind 500 which includes headrail 510 and slats 520. The side of headrail 510 is removed so the viewer may see parts within. A side view of a battery housing as illustrated in previous Figures herein is visible within headrail 510. A side view of elongated battery compartment 130a below base 120 is visible. Tilt rod 140 is shown passing through the battery housing. Gearbox 530 is shown within headrail 510. In some embodiments, the battery housing may be connected to gearbox 530 to provide power to the gears.

Figure 6:
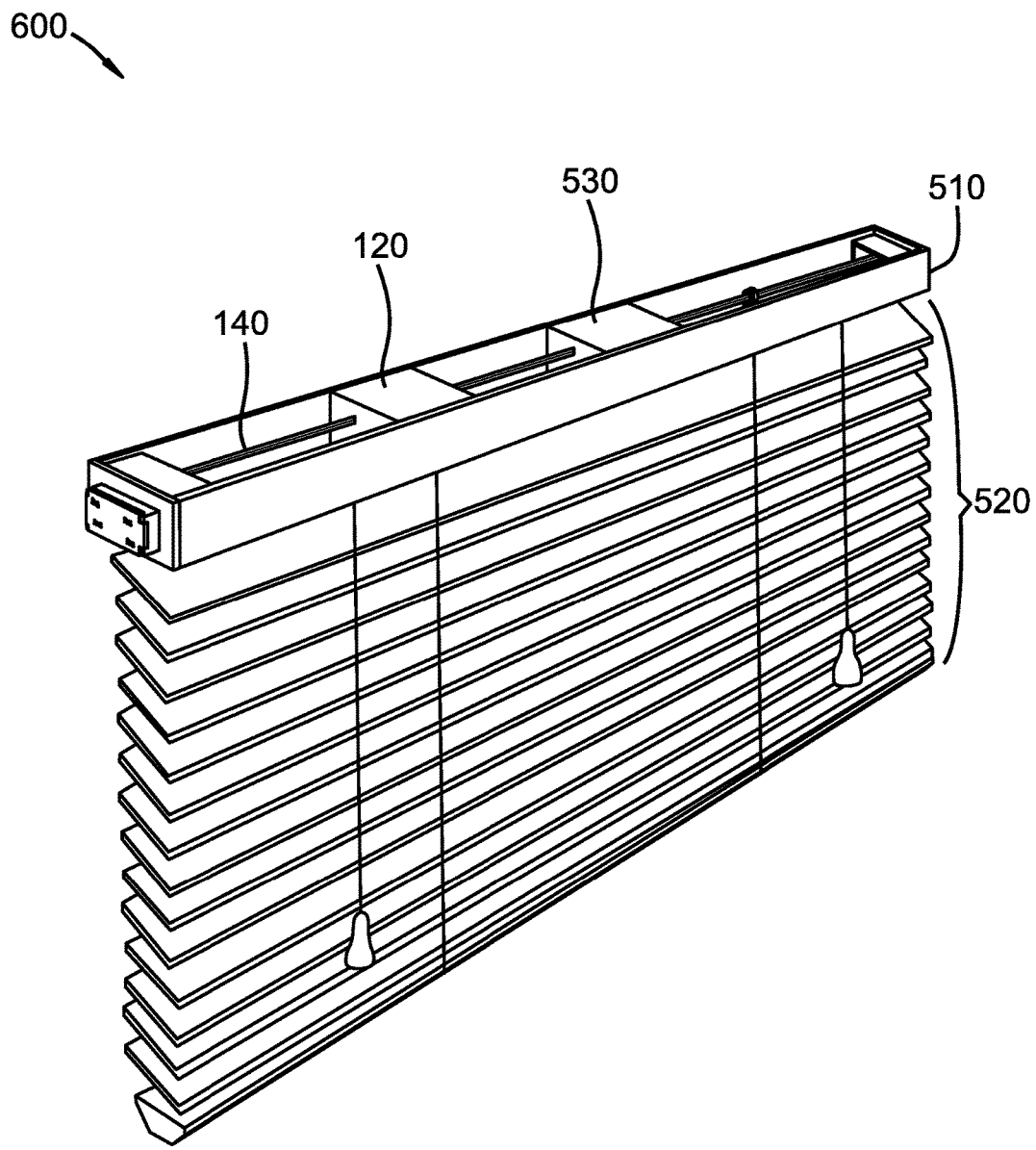
FIG. 6 illustrates a window blind that includes a headrail with a top side cut away to reveal an embodiment of the disclosed battery housing.

FIG. 6 shows window blind 600 which includes headrail 510 and slats 520. In FIG. 6, the top of headrail 510 is removed so the viewer may see parts within from above. The first side of base 120 is visible with tilt rail 140 passing below it. Gearbox 530 is again shown within headrail 510 to the right of the battery housing.

Figure 7:
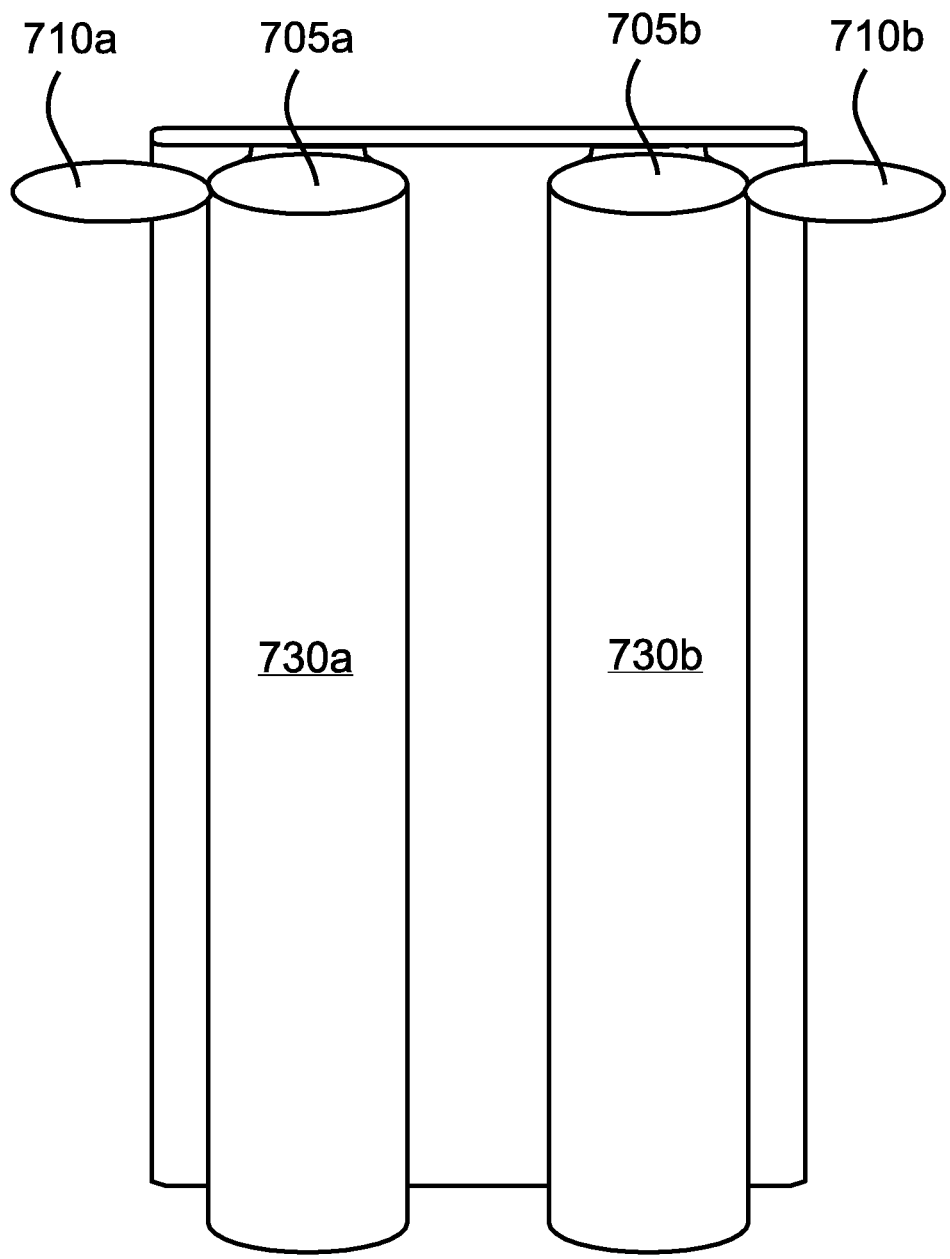
FIG. 7 illustrates an embodiment of the disclosed battery housing in which the elongated battery compartments open on their ends to receive batteries.

FIG. 7 shows an embodiment of the disclosed battery housing. This embodiment includes elongated battery compartments 730a and 730b with removable lids 710a and 710b on their short ends. Removable lids 710a and 710b cover apertures 705a and 705b into which a user may insert batteries.

Figure 8:
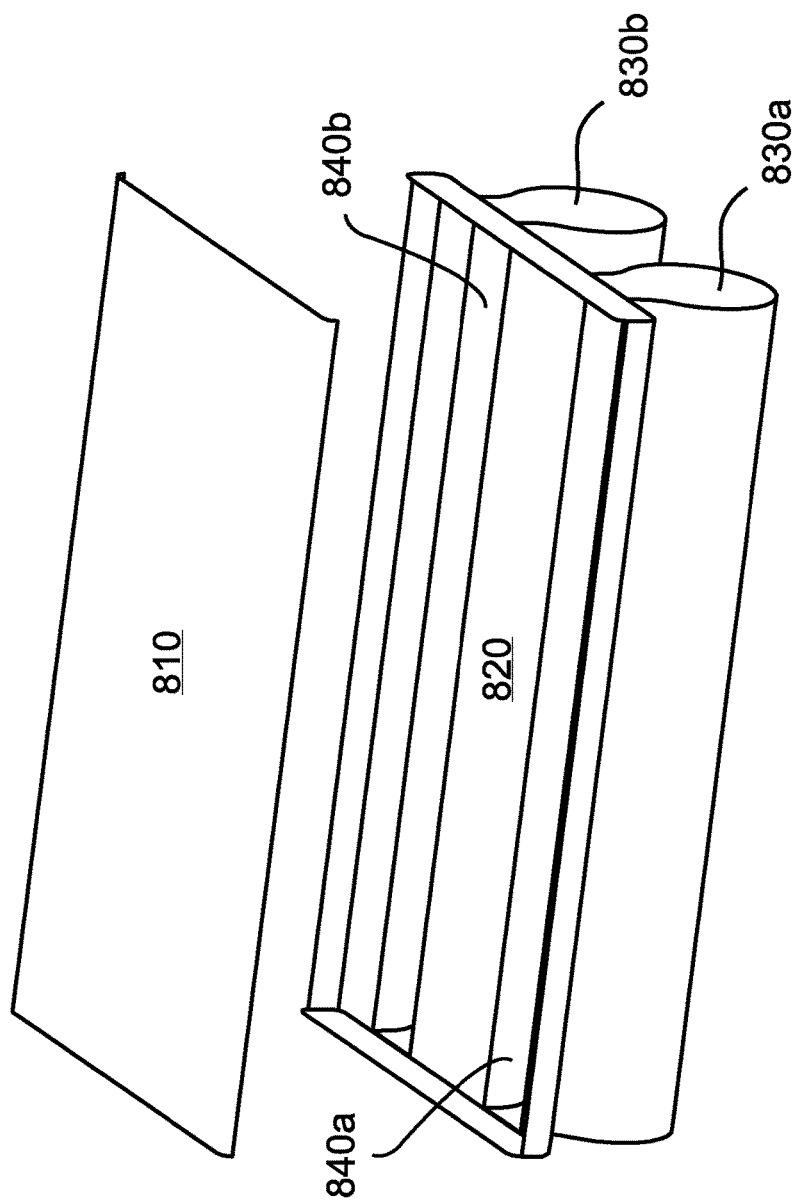
FIG. 8 illustrates an embodiment of the disclosed battery housing in which a first side of the base is removable to expose two orifices in the long sides of the elongated battery compartments which may receive batteries.

FIG. 8 shows another embodiment of the disclosed battery housing which includes elongated battery compartments 830a and 830b. The longer sides of elongated battery compartments 830a and 830b includes openings 840a and 840b respectively. First side 810 of the base has been lifted upwards to expose openings 840a and 840b. Second side 820 of the base remains connected to elongated battery compartments 830a and 830b.

While specific embodiments have been illustrated and described above, it is to be understood that the disclosure provided is not limited to the precise configuration, steps, and components disclosed. Various modifications, changes, and variations apparent to those of skill in the art may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art that changes may be made to the details of the above-described embodiments without departing from the underlying principles of the disclosure herein.

The invention claimed is:

1. A battery housing for a window blind comprising:
two spaced apart elongated battery compartments for housing a plurality of batteries wherein each of the two elongated battery compartments comprises a length and a width of a generally keyhole shaped cylinder comprising a circular portion intersecting a rectangular portion, wherein the two elongated battery compartments are disposed substantially parallel to each other;
a partially keyhole shaped elongated channel partially formed by adjacent walls of the generally keyhole shaped battery compartments, the partially keyhole shaped elongated channel comprising a bottom surface joining the respective tubular shaped battery compartments along the rectangular portions, wherein the partially keyhole shaped elongated channel is positioned in the space between and substantially parallel to the respective elongated battery compartments;
a base housing, the base housing comprising a first side and a second side joined by side walls defining an interior of the base housing, wherein the second side of the base housing is mechanically connected to the elongated keyhole shaped battery compartments substantially along the length of each of the rectangular portions of the respective elongated battery compartments, wherein the respective rectangular portions are open to the interior and wherein a section of the second side of the base housing defines the bottom surface of the elongated channel and the first side of the base housing is attached to the side walls opposite the second side and provides a cover for the base housing.

2. The battery housing of claim 1, wherein the two elongated generally keyhole shaped battery compartments are cylindrical.

3. The battery housing of claim 1, wherein each of the elongated generally keyhole shaped battery compartments comprise a substantially rectangular cross-section.

4. The battery housing of claim 1, wherein each of the elongated generally keyhole shaped battery compartments comprises a substantially square cross-section.

5. The battery housing of claim 1, wherein the first and second sides of the base housing are substantially flat.

6. The battery housing of claim 1, wherein the base housing is substantially rectangular.

7. The battery housing of claim 1, wherein the base housing is substantially square.

8. The battery housing of claim 1, wherein the generally tubular keyhole shaped battery compartments comprises one or more of the following: a synthetic hydrocarbon polymer, wood, and aluminum.

9. The battery housing of claim 8, wherein the synthetic hydrocarbon polymer is selected from one or more of the following: high-density polyethylene, low-density polyethylene, polyvinyl chloride, high impact polystyrene, polycarbonate and polycarbonate/acrylonitrile butadiene styrene.

10. The battery housing of claim 1, wherein at least one of the two elongated generally keyhole shaped battery compartments comprise an orifice for inserting wires.

11. The battery housing of claim 1, wherein at least one of the two elongated generally keyhole shaped battery compartments comprises a universal serial bus port.

12. The battery housing of claim 1, wherein the width of the partially keyhole shaped elongated channel varies between approximately 0.5 inches and approximately 3 inches.

13. The battery housing of claim 1, wherein the width of the partially keyhole shaped elongated channel varies between approximately 1 inch and approximately 2 inches.

14. The battery housing of claim 1, wherein the length of each of the two elongated generally tubular keyhole shaped battery compartments is between approximately 2 inches and approximately 8 inches.

15. The battery housing of claim 1, wherein the length of each of the two elongated generally keyhole shaped battery compartments is between approximately 4 inches and approximately 6 inches.

16. The battery housing of claim 1, wherein each of the two elongated generally keyhole shaped battery compartments further comprises an aperture for inserting batteries, wherein each aperture is covered by a removable lid.

17. The battery housing of claim 1, wherein the first side of the base housing is removably connected to the side walls of the base housing.

18. The battery housing of claim 1, wherein the first side of the base housing defines a removable cover, wherein each of the two elongated generally keyhole shaped battery compartments comprises an opening along the length of the elongated battery compartment wherein the removable cover is removably attached to the side walls of the second side of the base housing and the two generally tubular keyhole shaped elongated battery compartments, and wherein the removable cover is positioned over the openings of each of the two elongated battery compartments.

19. The battery housing of claim 1, further comprising a plurality of fastening devices for securing the battery housing to a headrail.

20. The battery housing of claim 19, wherein the plurality of fastening devices is selected from one or more of the following: clips, magnets, hooks, screws, bolts with nuts, clamps, clasps, flanges, and clutches.

* * * * *